United States Patent
Nakajima

(10) Patent No.: US 7,419,173 B2
(45) Date of Patent: Sep. 2, 2008

(54) SUPPORTING STRUCTURE OF STABILIZER TO VEHICLE BODY

(75) Inventor: Kiyoshi Nakajima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 266 days.

(21) Appl. No.: 10/774,526

(22) Filed: Feb. 10, 2004

(65) Prior Publication Data

US 2004/0155427 A1  Aug. 12, 2004

(30) Foreign Application Priority Data

Feb. 10, 2003  (JP)  ............................ P2003-032784

(51) Int. Cl.
*B60G 11/20* (2006.01)

(52) U.S. Cl. .................. 280/124.107; 280/124.166

(58) Field of Classification Search .......... 280/124.166, 280/124.169, 124.107; 267/188, 189, 273; *B60G 11/20*
See application file for complete search history.

(56) References Cited

U.S. PATENT DOCUMENTS

| | | | | |
|---|---|---|---|---|
| 2,082,509 A | * | 6/1937 | Rabe | 267/276 |
| 2,453,117 A | * | 11/1948 | Buckendale | 267/276 |
| 3,990,725 A | * | 11/1976 | Allison | 280/124.146 |
| 4,132,433 A | * | 1/1979 | Willetts | 280/124.162 |
| 5,387,004 A | * | 2/1995 | Engel | 280/124.152 |
| 6,007,079 A | * | 12/1999 | Kincaid et al. | 280/93.511 |
| 6,672,605 B2 | * | 1/2004 | Basnett | 280/124.128 |

FOREIGN PATENT DOCUMENTS

| | | |
|---|---|---|
| JP | 62-118715 U | 7/1987 |
| JP | 63-180511 A | 7/1988 |
| JP | 1-111005 | 7/1989 |
| JP | 2000-108633 | 4/2000 |

OTHER PUBLICATIONS

Japanese Utility Model Unexamined Publication JP-UM-A-3-112407, Nov. 18, 1991, Concise Statement of Claims 1-3.

* cited by examiner

*Primary Examiner*—Ruth Ilan
(74) *Attorney, Agent, or Firm*—Arent Fox LLP

(57) ABSTRACT

A supporting structure of a stabilizer to a vehicle body including a twist-deformable torsion bar having a pair of arms at respective ends thereof, the arms being connected to a suspension and a supporting device supporting the near the ends of the torsion bar on a vehicle body and having ball joints for supporting the torsion bar rotatably relative to the vehicle body.

4 Claims, 19 Drawing Sheets

SUPPORTING STRUCTURE OF STABILIZER TO VEHICLE BODY

BACKGROUND OF THE INVENTION

1. Field of the Invention

The present invention relates to a supporting structure of a stabilizer to a vehicle body comprising a twist-deformable torsion bar having a pair of arms at respective ends thereof, the arms being connected to a suspension and a supporting device supporting the near the ends of the torsion bar on the vehicle body.

2. Description of the Related Art

The supporting structure of a stabilizer to a vehicle body is known in JP-A-2000-108633. In this structure, a U-shaped lower bracket is welded to a flat bottom surface of an upper bracket fixed to the vehicle body, and a stabilizer is rotatably passed through a through hole in a rubber bushing held between the upper bracket and the lower bracket.

Incidentally, in the above structure, while a torsion bar of the stabilizer is passed through the through hole in the rubber bushing in such a manner that an outer circumferential surface of the torsion bar slides on an inner circumferential surface of the through hole, so that a twisted deformation of the torsion bar is permitted, since the friction coefficient of the rubber bushing is large, smooth sliding between the two members is prevented, and hence, the torsion bar is not allowed to twist to deform smoothly, thereby causing a problem that the riding comfort of the vehicle is deteriorated.

SUMMARY OF THE INVENTION

The present invention was made in this situation and an object thereof is to support a torsion bar of a stabilizer on a vehicle body in such a manner as to freely twist to deform.

With a view to attaining the object, according to a first aspect of the present invention, a supporting structure of a stabilizer to a vehicle body comprising a twist-deformable torsion bar having a pair of arms at respective ends thereof, the arms being connected to a suspension, and a supporting device supporting the near the ends of the torsion bar on the vehicle body, wherein the supporting device has ball joints for supporting the torsion bar rotatably relative to the vehicle body.

According to the construction, since the supporting device for supporting the torsion bar of the stabilizer on the vehicle body includes the ball joint, the torsion bar is allowed to freely twist to deform without being subjected to a large frictional force so as to effectively exhibit the function of the stabilizer, thereby making it possible to enhance the riding comfort of the vehicle.

According to a second aspect of the present invention, a supporting structure of a stabilizer to a vehicle body comprising a twist-deformable torsion bar having a pair of arms at respective ends thereof, the arms being connected to a suspension and a supporting device supporting the near the ends of the torsion bar on a vehicle body and including an annular shape elastic member and a joint having an inner tube and an outer tube, wherein the inner tube and the outer tube of the joint are fixed to an inner circumference and an outer circumference of the elastic member respectively, one of the inner tube and the outer tube is fixed to the vehicle body and the other is fixed to the torsion bar.

According to the construction, since a supporting device supporting the near the ends of the torsion bar on a vehicle body includes an annular shape elastic member and a joint having an inner tube and an outer tube, the inner tube and the outer tube of the joint are fixed to an inner circumference and an outer circumference of the elastic member respectively, one of the inner tube and the outer tube is fixed to the vehicle body and the other is fixed to the torsion bar, the torsion bar is allowed to freely twist to deform without being subjected to a large frictional force due to a circumferential shear deformation of the elastic body so as to effectively exhibit the function of the stabilizer, thereby making it possible to enhance the riding comfort of the vehicle.

According to a third aspect of the present invention a supporting structure of a stabilizer to a vehicle body comprising a twist-deformable torsion bar having a pair of arms at respective ends thereof, the arms being connected to a suspension and a supporting device supporting the near the ends of the torsion bar on a vehicle body and including a supporting shaft fixed to one of the torsion bar and the vehicle body and an elastic member fixed to the other of the torsion bar and the vehicle body, wherein the supporting shaft has an axis intersecting with an axis of the torsion bar and passes through the elastic member.

According to the construction, since a supporting device supporting the near the ends of the torsion bar on a vehicle body includes a supporting shaft fixed to one of the torsion bar and the vehicle body and an elastic member fixed to the other of the torsion bar and the vehicle body, the supporting shaft has an axis intersecting with an axis of the torsion bar and passes through the elastic member, the torsion bar is allowed to freely twist to deform without being subjected to a large frictional force due to a compression deformation of the elastic body so as to effectively exhibit the function of the stabilizer, thereby making it possible to enhance the riding comfort of the vehicle.

According to a fourth aspect of the present invention as set forth in the second aspect of the present invention, an axis torsion bar is identical to an axis of the elastic member.

According to a fifth aspect of the present invention as set forth in the second aspect of the present invention, an axis of torsion bar is parallel to an axis of the elastic member.

According to a sixth aspect of the present invention as set forth in the first aspect of the present invention, the ball joint is a pillow ball joint.

DETAILED DESCRIPTION OF THE PREFERRED EMBODIMENT

A mode for carrying out the present invention will be described below based on embodiments of the present invention shown in the accompanying drawings.

Figure 1:
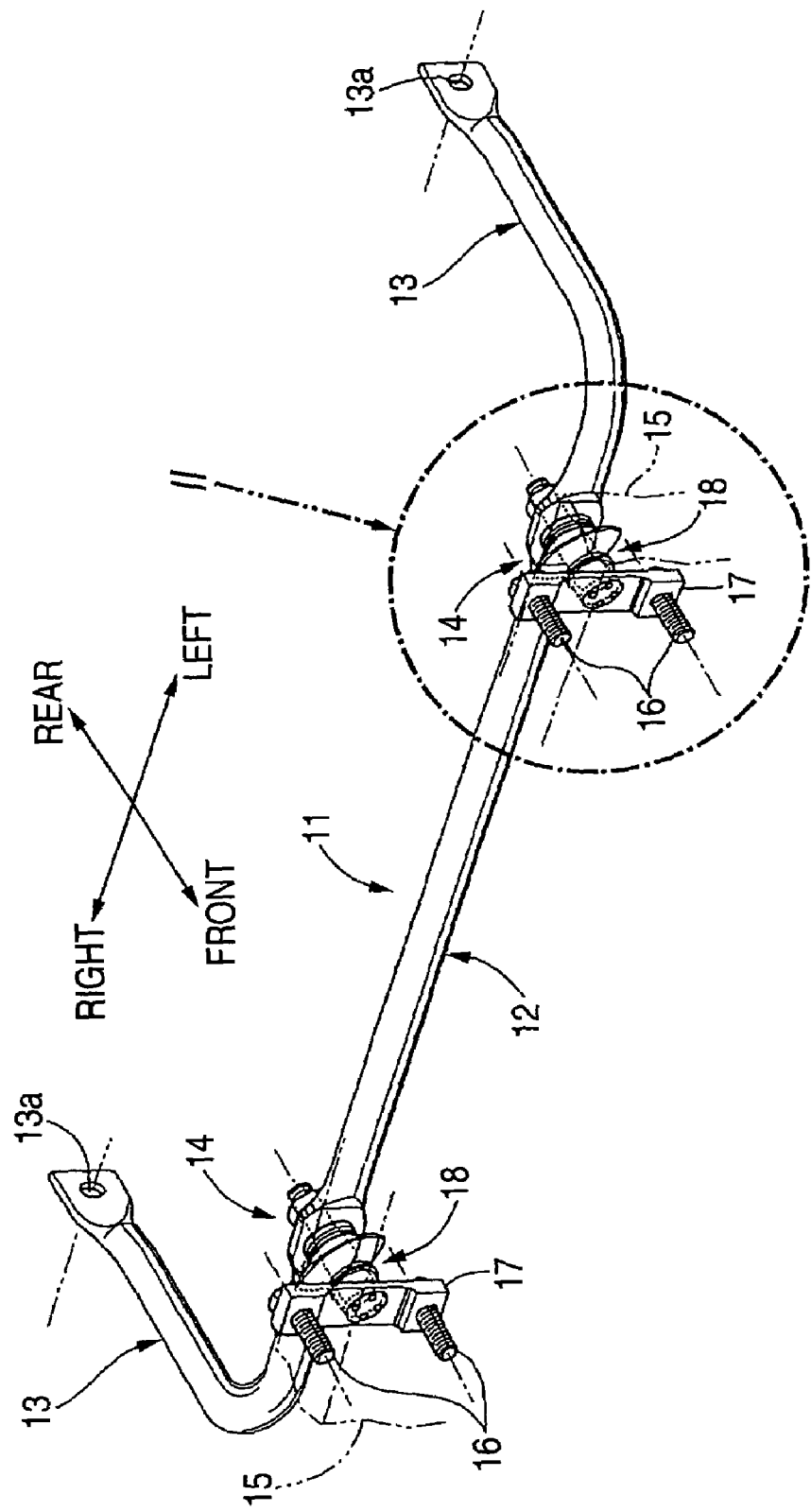
FIG. 1 is a perspective view of a supporting device for a stabilizer according to a first embodiment of the present invention.
Figure 2:
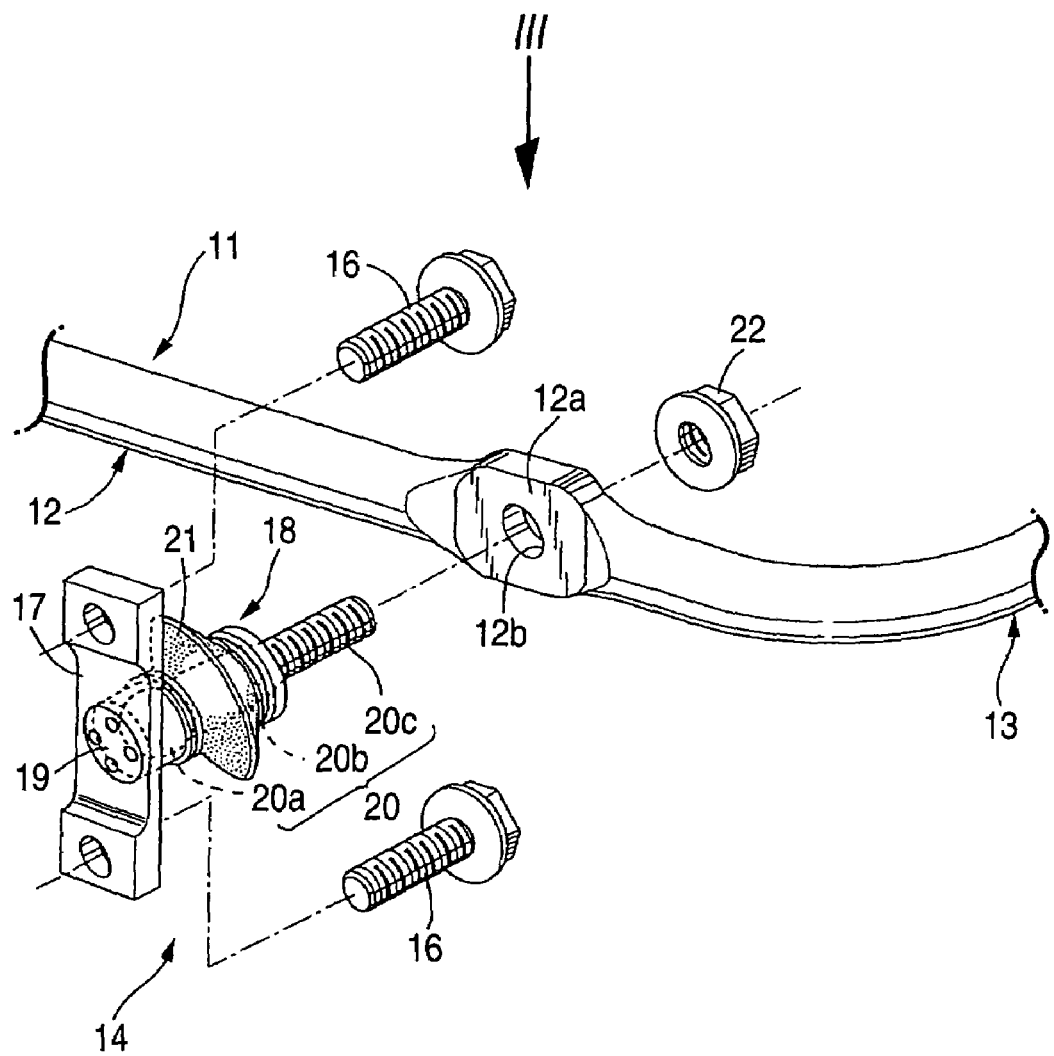
FIG. 2 is an enlarged view of a portion denoted by reference numeral 2 in FIG. 1.
Figure 3:
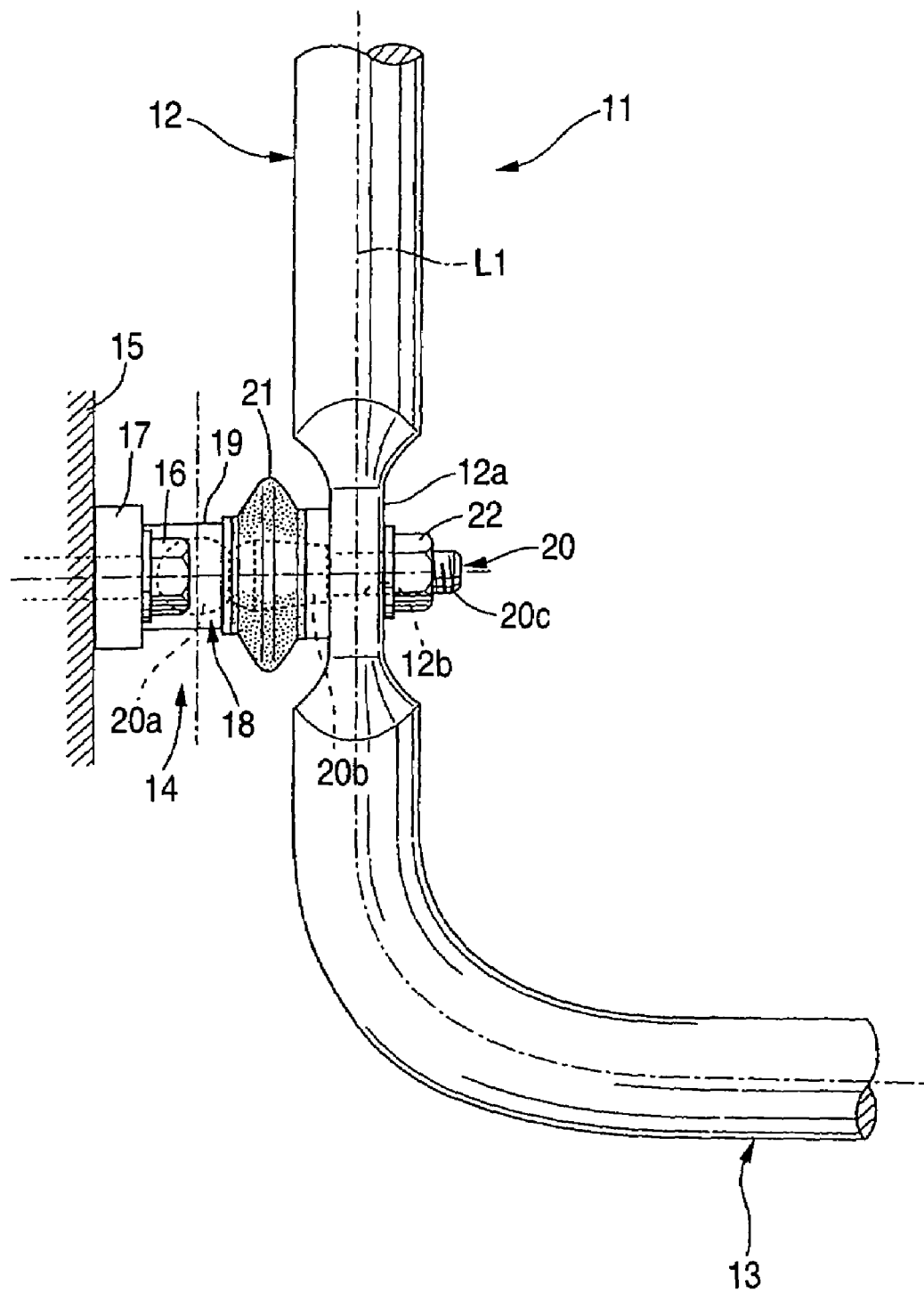
FIG. 3 is a view as seen in a direction indicated by an arrow 3 in FIG. 2.

FIGS. 1 to 3 are drawings which show a first embodiment which corresponds to the first aspect of the present invention, FIG. 1 being a perspective view of a stabilizer and supporting device therefor, FIG. 2 being an enlarged view of a portion indicated by reference numeral 2 in FIG. 1, and FIG. 3 being a view as seen in a direction indicated by an arrow 3 in FIG. 2.

A stabilizer 11 includes a torsion bar (a twist-deformable torsion bar) 12 which extends in a transverse direction of a vehicle body and a pair of arms 13, 13 which extend, respectively, from left and right ends of the torsion bar 12 to the rear of the vehicle body, and attaching portions 13a, 13a at distal ends of the arms 13, 13 are connected to suspension arms of left and right suspensions or knuckles. In addition, the left and right ends of the torsion bar 12 are supported on the vehicle body 15 via supporting device 14, 14, respectively.

Since the left and right supporting device 14, 14 are constructed in the same way, only one of them will be described. Flat portions 12a which are pressed in a longitudinal direction of the vehicle body are formed at the ends of the torsion bar 12 whose cross section is basically circular, and a bolt hole 12b passes through a center of the flat portion 12a in the longitudinal direction. The supporting device 14 has a plate-like bracket 17 which is fixed to the vehicle body 15 with two bolts 16, 16, and this bracket 17 and the flat portion 12a of the torsion bar 12 are connected to each other by means of a ball joint 18.

The ball joint 18 is constituted by a housing 19, ball stud 20, a boot 21 and a nut 22, and the housing 19 is fixed to the bracket 17. The ball stud 20 includes a spherical head portion 20a which is supported on the housing 19 in such a manner as to freely swing, a stalk portion 20b which extends integrally from the spherical head portion 20a and an externally threaded portion 20c formed in a distal end of the stalk portion 20b, and the externally threaded portion 20c passes through the bolt hole 12b in the flat portion 12a of the torsion bar 12 and is then fastened by the nut 22. Then, the rubber boot 21 which covers the stalk portion 20b is connected to the housing 19 and the flat portion 12a of the torsion bar 12 in order to protect sliding surfaces of the housing 19 and the spherical head portion 20a from water and dust. The position of the spherical head portion 20a is deviated to the front of the vehicle body relative to an axis L1 of the torsion bar 12.

According to the construction, when the vehicle is driven on a road having irregularities, left and right wheels fluctuating vertically in different phases, a difference in angle is generated between the left and right arms 13, 13 of the stabilizer 11, and then the torsion bar 12 twists and deforms elastically so as to generate by virtue of a restoring force a load acting to make the phases of the vertical fluctuations of the left and right wheels coincide with each other.

As this occurs, since the ball joint 18 of each of the left and right supporting device 14 provided on the torsion bar 12 permits a free twist deformation of the torsion bar 12 through a relative rotation of the housing 19 and the spherical head portion 20a, the function of the stabilizer is allowed to be exhibited in an ensured fashion, thereby making it possible to enhance the riding comfort of the vehicle.

Thus, since the supporting device 14 according to the first embodiment permits the twist deformation of the torsion bar 12 via the ball joint 18, the necessity of the elastic body used in the conventional supporting device is obviated, and there is caused no risk that the smooth twist deformation of the torsion bar is prevented by the frictional force generated by sliding which occurs between the elastic body and the torsion bar and/or between the elastic body and a holder of the vehicle body.

Figure 4:
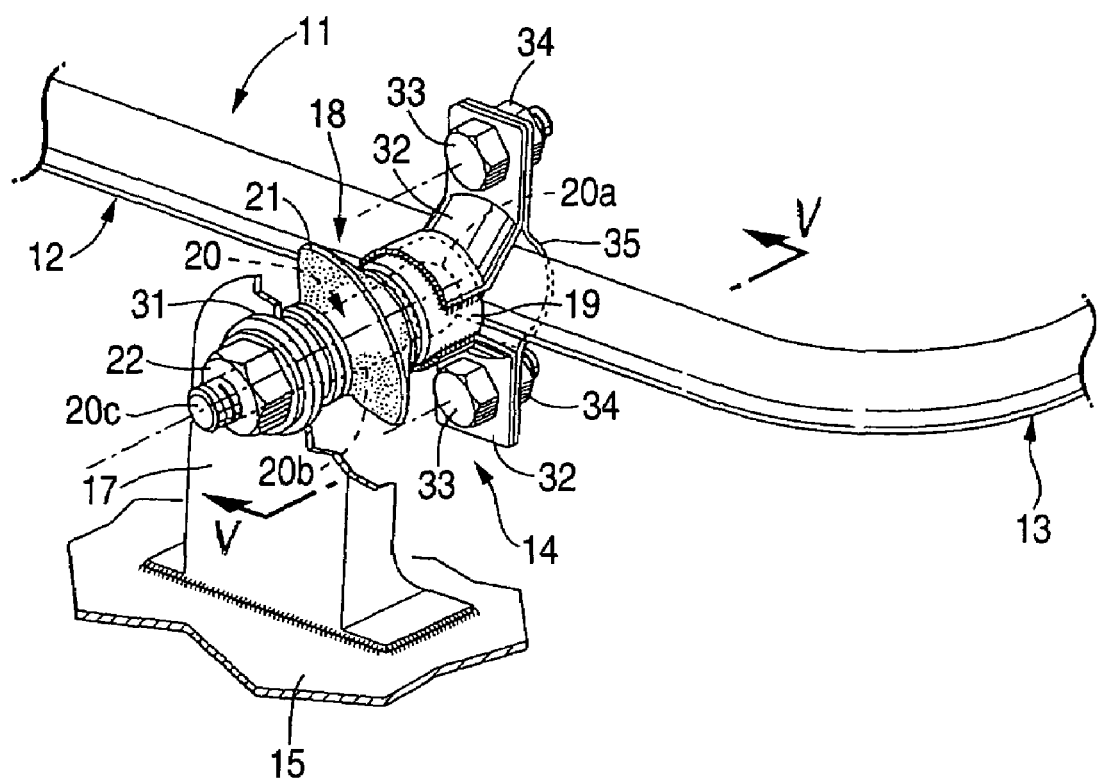
FIG. 4 is a perspective view of a supporting device for a stabilizer according to a second embodiment of the present invention.
Figure 5:
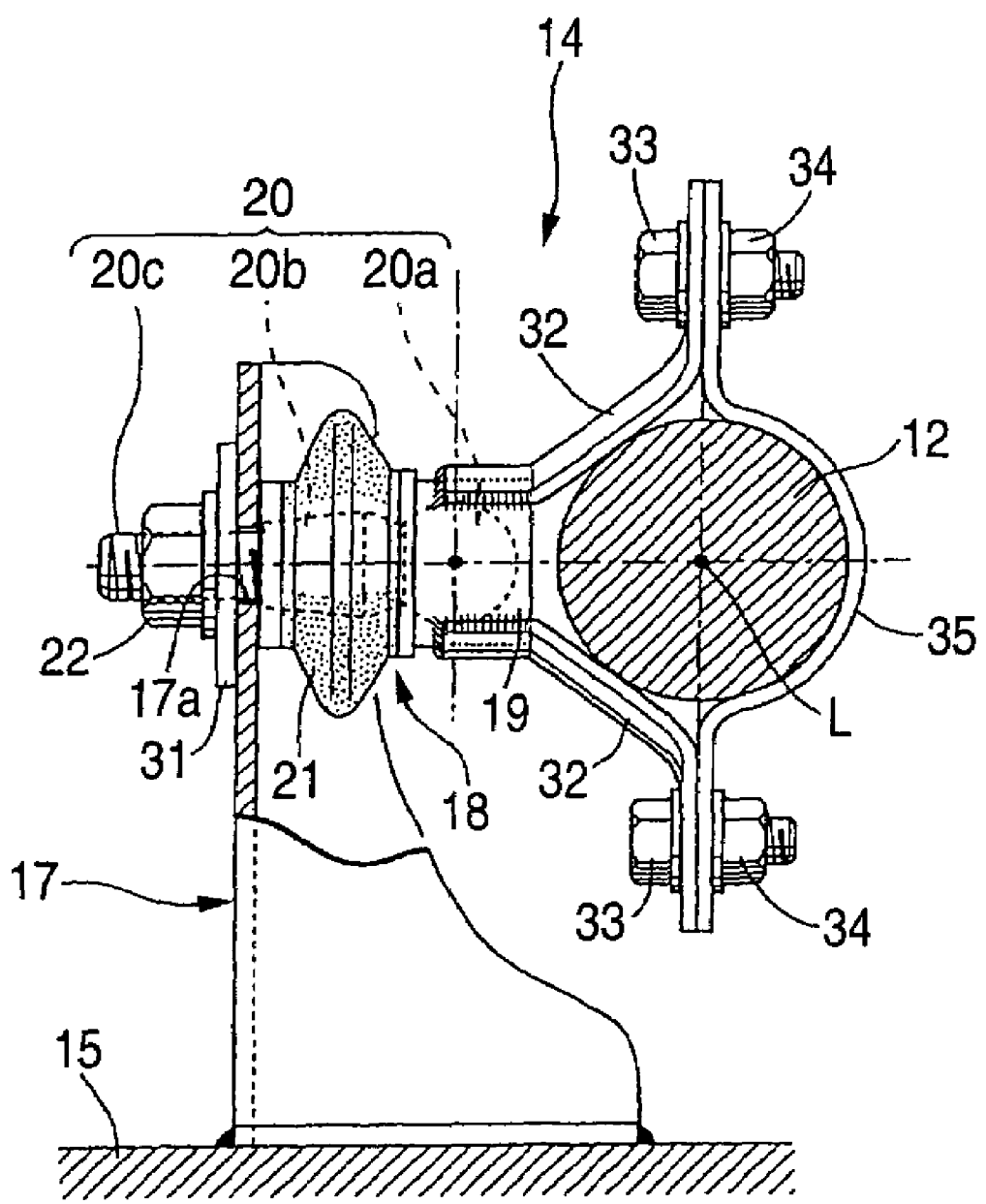
FIG. 5 is a cross-sectional view taken along the line 5-5 in FIG. 4.

FIGS. 4 and 5 are drawings showing a second embodiment which corresponds to the first aspect of the present invention, FIG. 4 being a perspective view of a supporting device for a stabilizer and FIG. 5 being an enlarged view taken along the line 5-5 in FIG. 4. Note that in respective embodiments below, like reference numerals are given to like constituent components to those of the embodiments that have been described previously, and the repetition of similar descriptions will be omitted.

While a supporting device 14 according to the second embodiment has a ball joint 18 which is constructed in the same manner as the ball joint 18 of the supporting device 14 of the first embodiment, an attaching structure of the supporting device 14 of the second embodiment is different. Namely, an externally threaded portion 20c of a ball stud 20 of the ball joint 18 passes through a bolt hole 17a in a bracket 17 and is then fastened via a washer 31 by a nut 22. In addition, two first brackets 32, 32 are welded to a housing 19 of the ball joint 18, and a torsion bar 12 is held to be fixed in place between these first brackets 32, 32 and a second bracket 35 which is fixed to the brackets by bolts 33, 33 and nuts 34, 34.

Also with this second embodiment, since the ball joint 18 of each supporting device 14 permits a free twist deformation of the torsion bar 12 through a relative rotation of the housing 19 to a spherical head portion 20a, the function of a stabilizer can be exhibited in an ensured fashion so as to obtain similar function and advantage to those of the first embodiment.

Figure 6:
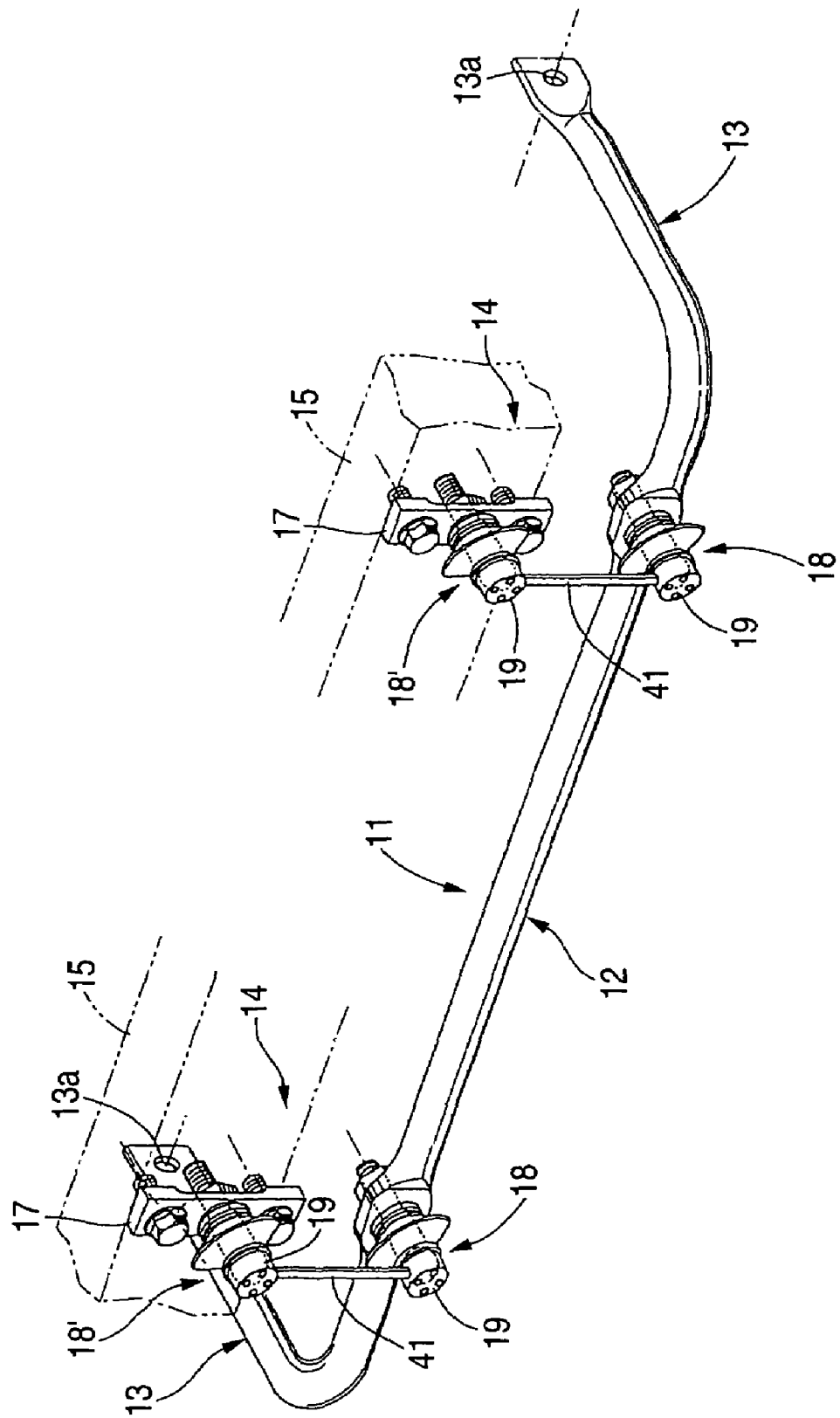
FIG. 6 is a perspective view of a supporting device for a stabilizer according to a third embodiment of the present invention.

Next, a third embodiment which corresponds to the first aspect of the present invention will be described below based on FIG. 6.

The third embodiment is a modification to the first embodiment, and each supporting device 14 according to the third embodiment has, as with the first embodiment, a ball joint 18 attached to a torsion bar 12 of a stabilizer 11. Another ball joint 18' is provided above the ball joint 18 in such a manner that an externally threaded portion 20c of a ball stud 20 thereof is fixed to a bracket 17 of the vehicle body 15, and housings 19, 19 of the upper and lower ball joints 18, 18' having the same construction are connected to each other by a stabilizer link 41.

According to the third embodiment, the same function and advantage can be obtained by the lower ball joint 18, and furthermore, transverse motions of a stabilizer can be permitted through oscillation of the stabilizer link 41 which connects the upper and lower ball joints 18, 18' to each other.

Figure 7:
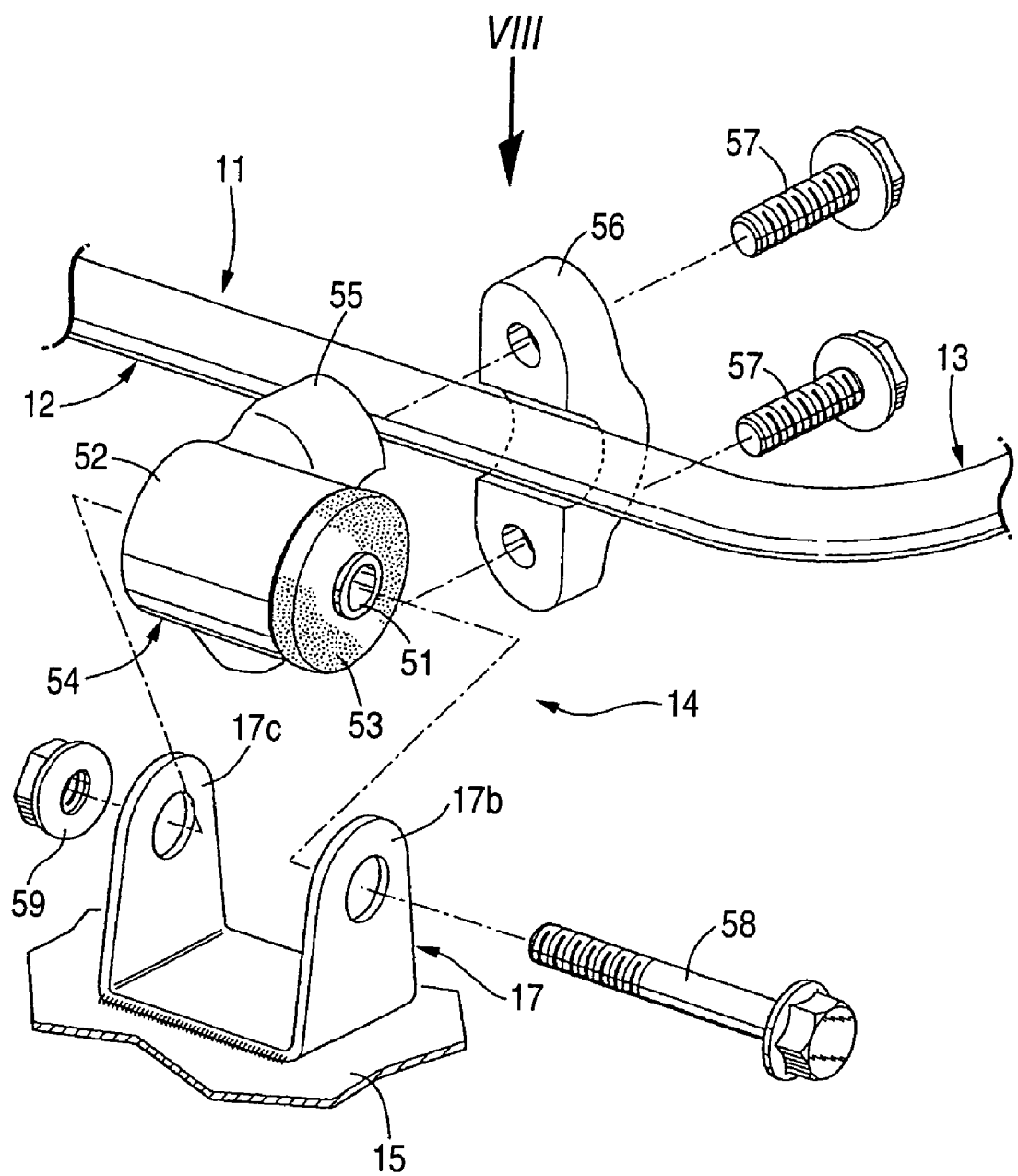
FIG. 7 is a perspective view of a supporting device for a stabilizer according to a fourth embodiment of the present invention.
Figure 8:
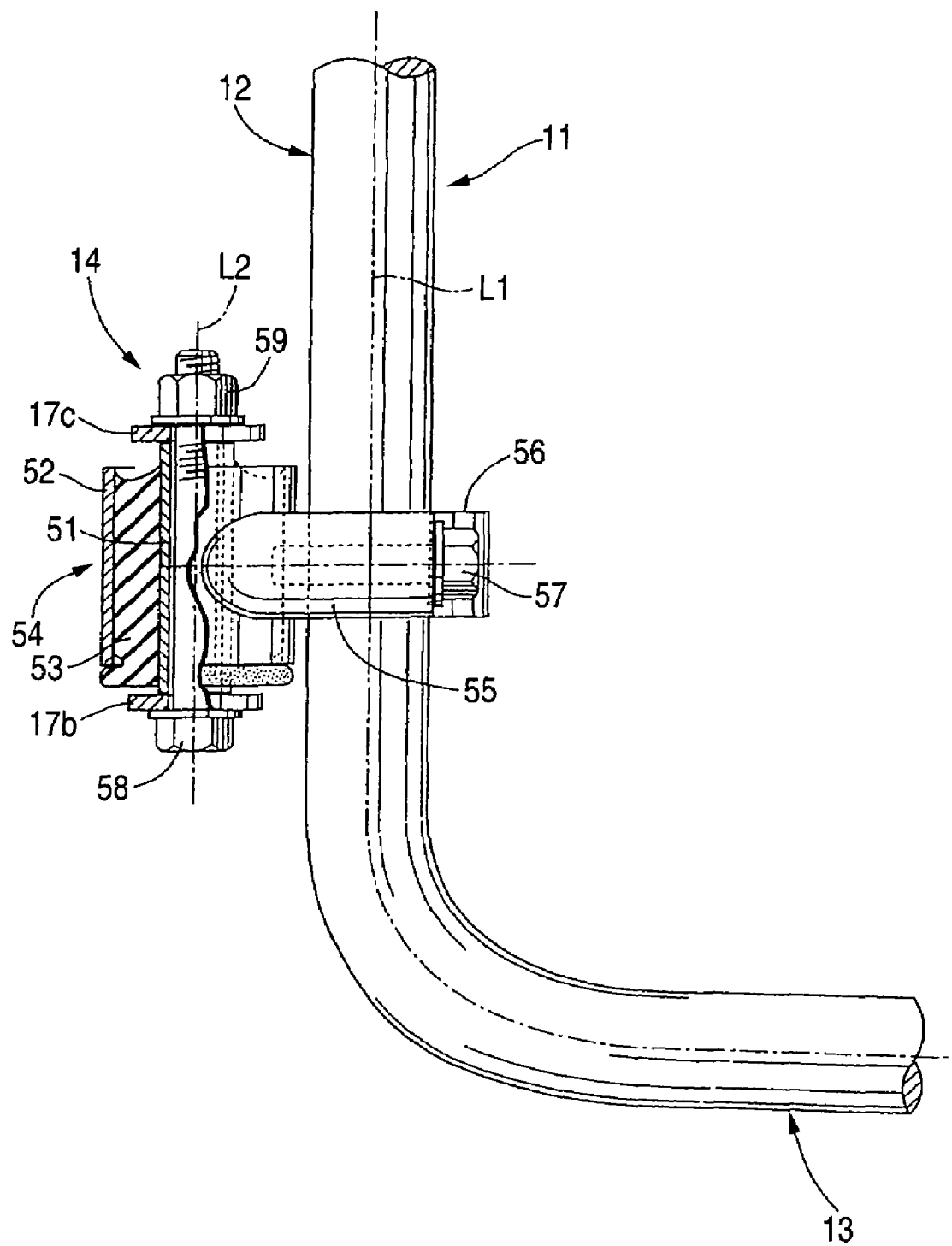
FIG. 8 is a view as seen in a direction indicated by an arrow 8 in FIG. 7.

FIGS. 7 and 8 are drawings showing a fourth embodiment which corresponds to the second aspect of the present invention, FIG. 7 being a perspective view of a supporting device for a stabilizer and FIG. 8 being a view as seen in a direction indicated by an arrow 8 in FIG. 7.

A supporting device of the fourth embodiment includes a bushing joint 54 including, in turn, an inner tube, an outer tube disposed coaxially on an outer side of the inner tube and an annular elastic body formed of a rubber which is vulcanization bonded between an outer circumferential surface of the inner tube 51 and an inner circumferential surface of the outer tube 52. A torsion bar 12 is held by a fixing portion 55 which is formed integrally with the outer tube 52 of the rubber bushing joint 54 and a fixing member 56 which cooperates with the fixing portion 55, and when the fixing member 56 is fixed to the fixing portion 55 with bolts 57, 57, the rubber bushing joint 54 is fixed to the torsion bar 12.

The rubber bushing joint 54 whose axis L2 is disposed in parallel with an axis L1 of the torsion bar 12 is fitted between a pair of supporting portions 17b, 17c of a U-shaped bracket 17 welded to the vehicle body 15, and a bolt 58 which passes through the supporting portions 17b, 17c and the inner tube 51 is fastened by a nut 59. As this occurs, part of the elastic body 53 is exposed from an end face of the outer tube 52 transversely outwardly, and transverse motions of the stabilizer 11 is restricted by allowing the exposed portion to confront the supporting portion 17b located on a transversely outer side of the bracket 17.

According to the fourth embodiment, when the torsion bar 12 of the stabilizer 11 twists to deform, the outer tube 52 fixed to the torsion bar 12 and the inner tubes 51 fixed to the bracket 17 of the vehicle body 15 rotate relative to each other while shear deforming the annular elastic body 53 in a circumferential direction. As a result, a free twist deformation of the torsion bar 12 is permitted so as to allow the function of the stabilizer to be exhibited in an ensured fashion, thereby making it possible to enhance the riding comfort of the vehicle.

Thus, since the supporting device 14 according to the fourth embodiment permits the twist deformation of the torsion bar 12 via the rubber bushing joint 54 with the elastic body 53 thereof being integrally fixed to the inner tube 51 and the outer tube 52, the generation of a frictional force by sliding between the elastic body 53 and the inner tube 51 or the outer tube 52 can be prevented so as to enable the smooth twist deformation of the torsion bar 12.

Figure 9:
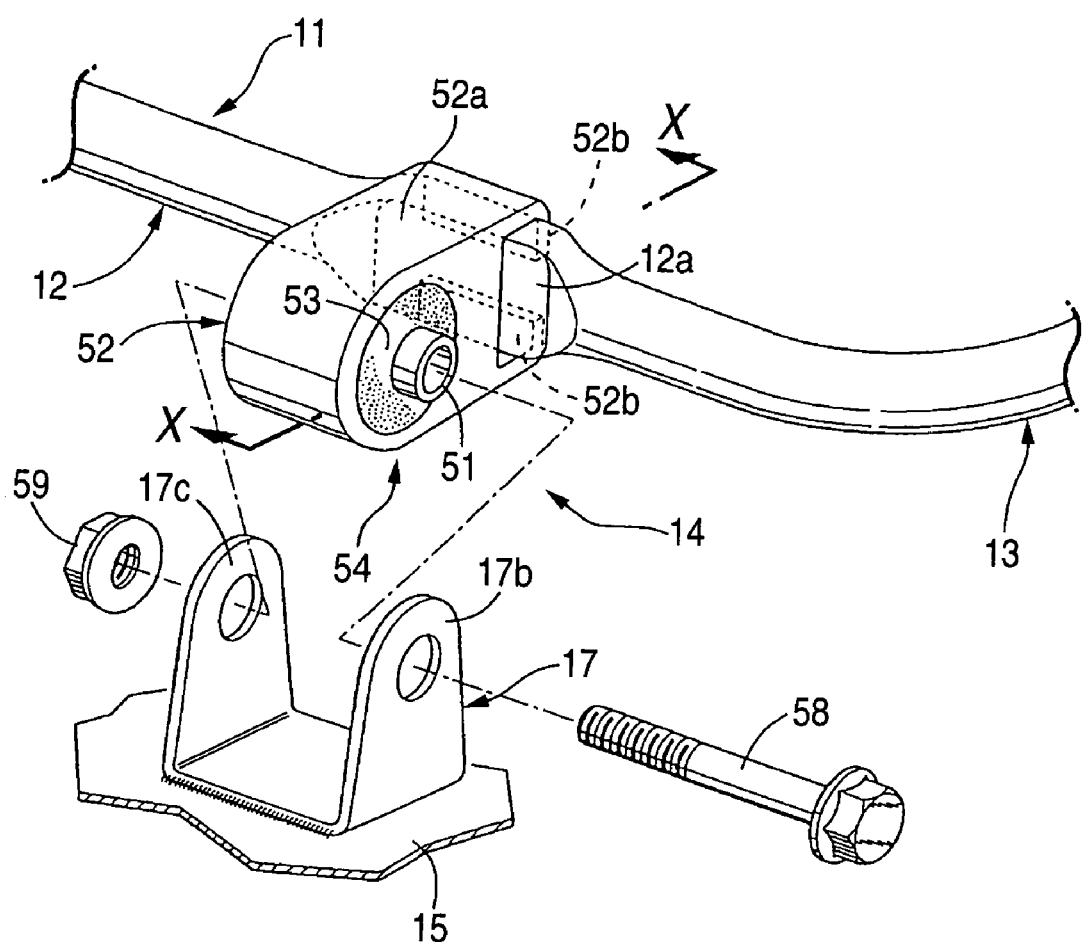
FIG. 9 is a perspective view of a supporting device for a stabilizer according to a fifth embodiment of the present invention.
Figure 10:
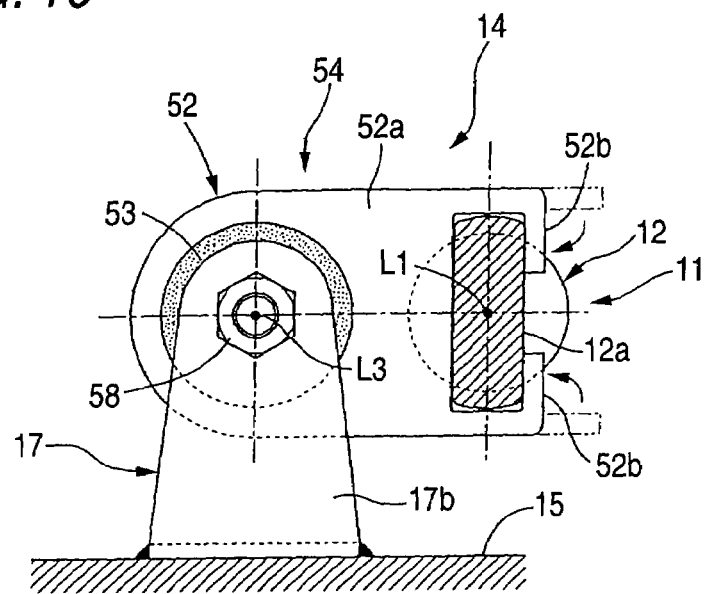
FIG. 10 is a cross-sectional view taken along the line 10-10 in FIG. 9.

FIGS. 9 and 10 are drawings showing a fifth embodiment which corresponds to the second aspect of the present invention, FIG. 9 being a perspective view showing a supporting device for a stabilizer and FIG. 10 being a cross-sectional view taken along the line 10-10 in FIG. 9.

The fifth embodiment is a modification to the fourth embodiment and is different from the fourth embodiment only in a construction where an outer tube 52 of a rubber bushing joint 54 is fixed to a torsion bar 12. Namely, the outer tube 52 of the rubber bushing joint 54 has an extension 52a which extends toward the torsion bar 12, and with a flat portion 12a of the torsion bar 12 which is press worked to become flat being in abutment with an end face of the extension 52a, a pair of fixing claws 52b, 52b are folded to fix the flat portion 12a.

The same function and advantage as those obtained by the fourth embodiment can also be obtained by the fifth embodiment.

Figure 11:
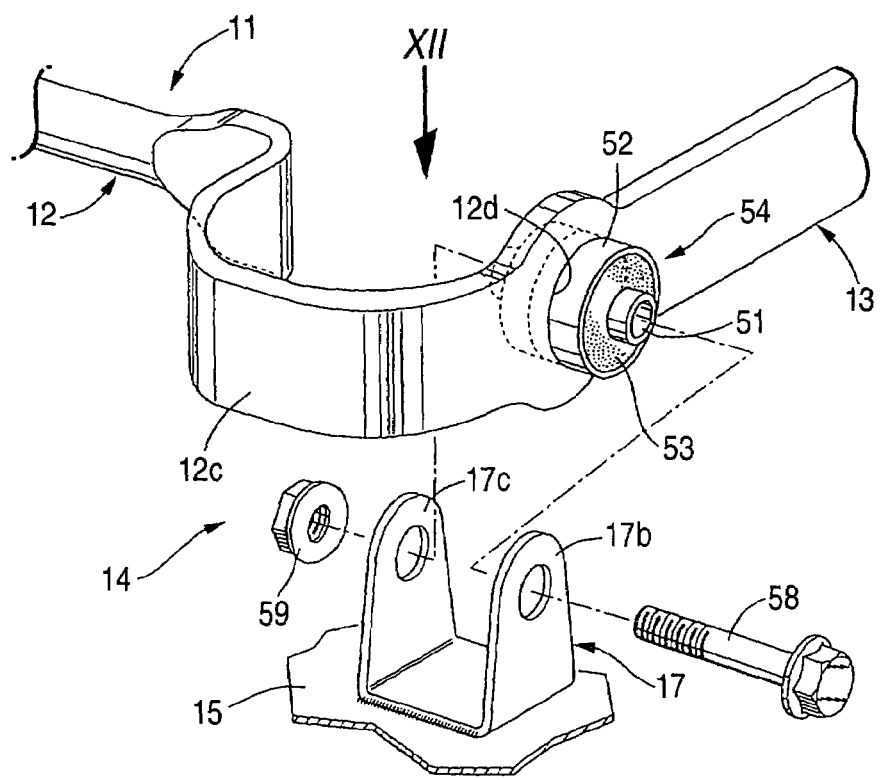
FIG. 11 is a perspective view of a supporting device for a stabilizer according to a sixth embodiment of the present invention.
Figure 12:
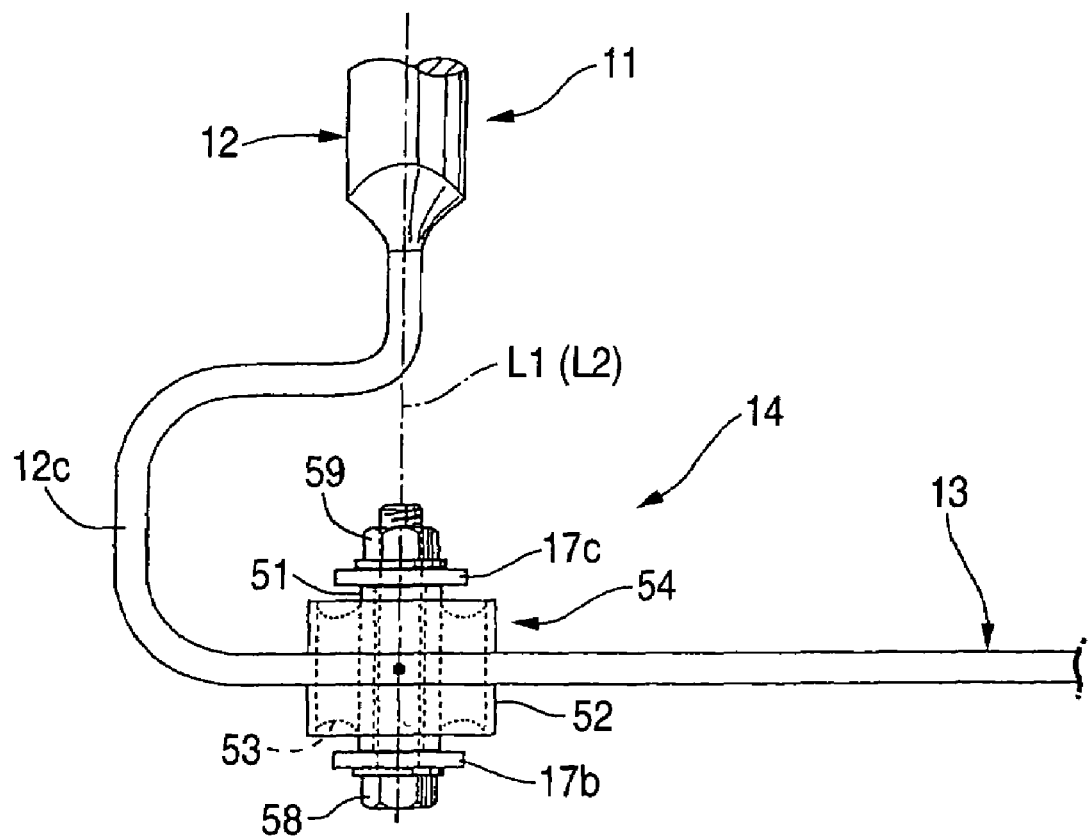
FIG. 12 is a view as seen in a direction indicated by an arrow 12 in FIG. 11.

FIGS. 11 and 12 are drawings showing a sixth embodiment which corresponds to the fourth aspect of the present invention, FIG. 11 being a perspective view of a supporting device for a stabilizer, and FIG. 12 being a view as seen in a direction indicated by an arrow 12 in FIG. 11.

The sixth embodiment is such as to use a common rubber bushing joint 54 which includes an inner tube 51, an outer tube 52 and an elastic body 53, and a torsion bar 12 has at ends thereof curved portions 12c which are each formed by press working end portions thereof so as to become flat and then bending the end portions made so flat into a U-like configuration, flat arms 13 continuously extending from the curved portions 12c, respectively. A circular joint supporting hole 12d is opened in the curved portion 12c which is positioned on an axis L1 of the torsion bar 12, so that the outer tube 52 of the rubber bushing joint 54 is press fitted in this joint supporting hole 12d. Then, the inner tube 51 of the rubber bushing joint 54 is fixed to a bracket 17 on the vehicle body 15 with a bolt 58 and a nut 59.

The same function and advantage as those obtained by the fourth embodiment can also be obtained by this sixth embodiment, and moreover, since the axis L1 of the torsion bar 12 is made to coincide with an axis L2 of the rubber bushing joint 54, the swing of the torsion bar 12 around the axis L2 of the rubber bushing joint 54 can be prevented, thereby making it possible to enable a smoother twist deformation of the torsion bar 12.

Figure 13:
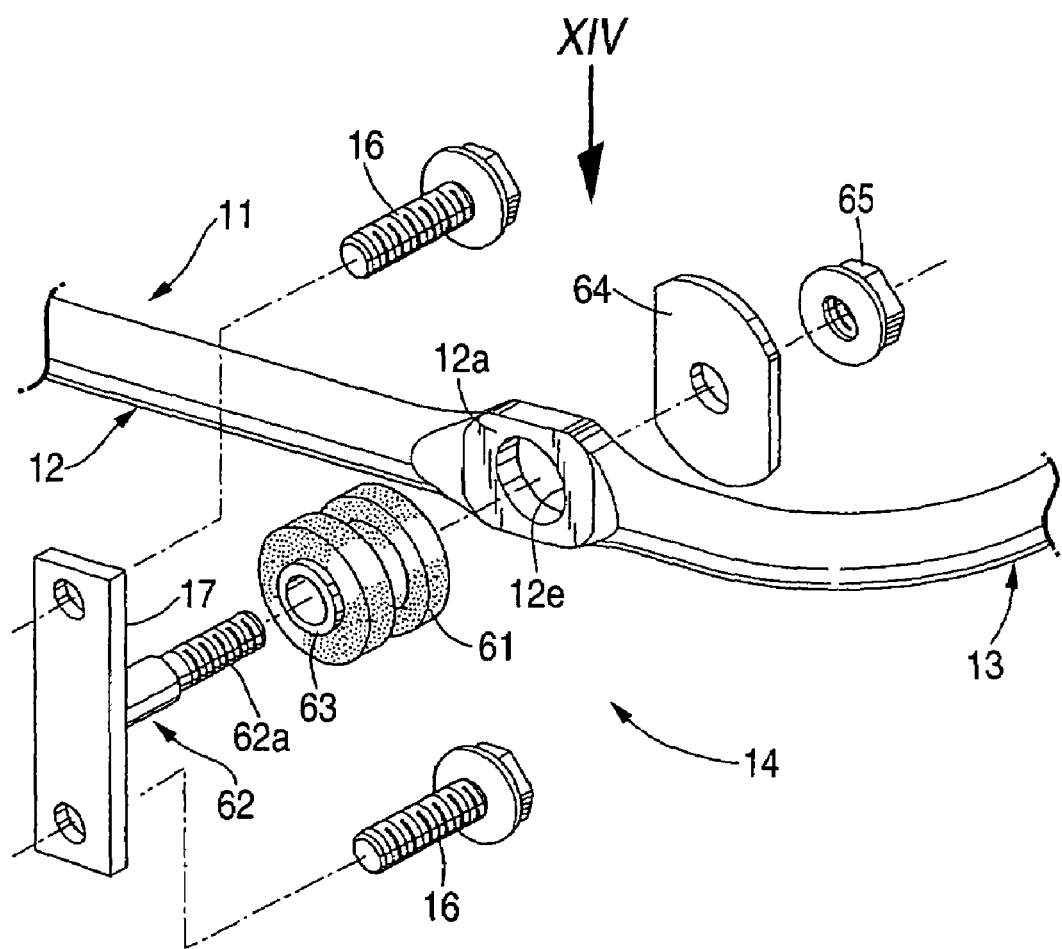
FIG. 13 is a perspective view of a supporting device for a stabilizer according to a seventh embodiment of the present invention.
Figure 14:
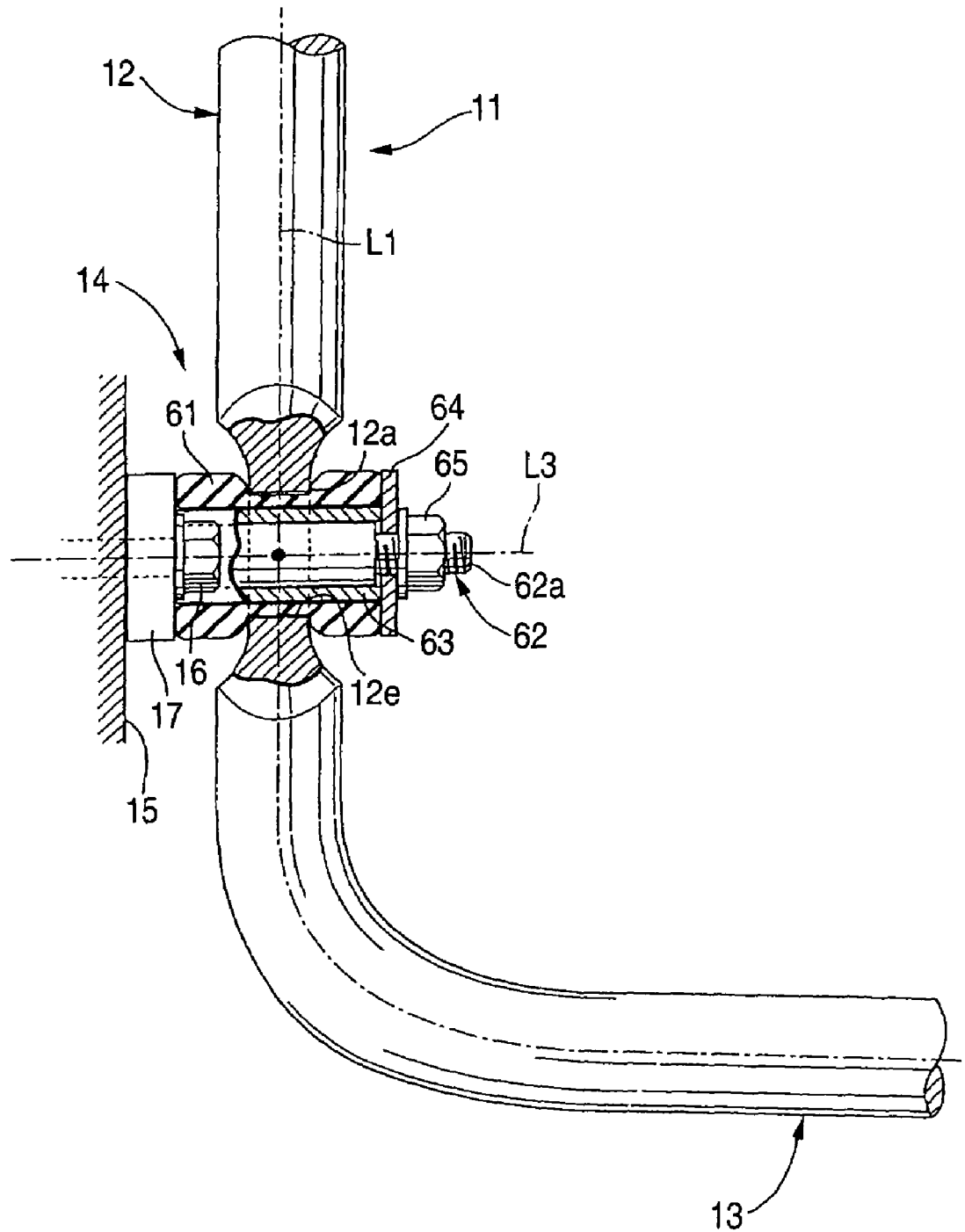
FIG. 14 is a view as seen in a direction indicated by an arrow 13 in FIG. 13.

FIGS. 13 and 14 are drawings showing a seventh embodiment which corresponds to a third aspect of the present invention, FIG. 13 being a perspective view of a supporting device for a stabilizer, and FIG. 14 being a view as seen in a direction indicated by an arrow 14 in FIG. 13.

In the seventh embodiment, an elastic body supporting hole 12e is provided in a flat portion 12a formed at each end portion of a torsion bar 12 of a stabilizer 11, and a bobbin-like elastic body 61 fits in the elastic body supporting hole 12e. On the other hand, a supporting shaft 62 which extends to the rear of the vehicle body and which has an axis L3 which intersects with an axis L1 of the torsion bar 12 is integrally provided on a bracket 17 fixed to the vehicle body 15 with bolts 16, 16, and an externally threaded portion 62a at an distal end of the supporting shaft 62 passes through an inner tube 63 which is vulcanization bonded to an inner circumferential surface of an elastic body 61 and a washer 64 and is then fastened by a nut 65.

According to this seventh embodiment, when the torsion bar 12 of the stabilizer 11 twists and deforms, the flat portions 12a of the torsion bar 12 which fits on an outer circumference of the elastic body 61 supported on the vehicle body 15 via the bracket 17, the supporting shaft 62 and the inner tube 63 twists and deforms around the axis L1 while compression deforming the elastic body 61, whereby the function of the stabilizer 11 is allowed to be exhibited in an ensured fashion, thereby making it possible to enhance the riding comfort of the vehicle.

Thus, since the supporting device 14 according to the seventh embodiment permits the twist deformation of the torsion bar 12 through the compression deformation of the elastic body 61, the generation of a frictional force by sliding between the elastic body 61 and the torsion bar 12 can be prevented to thereby permit a smooth twist deformation of the torsion bar 12.

Figure 15:
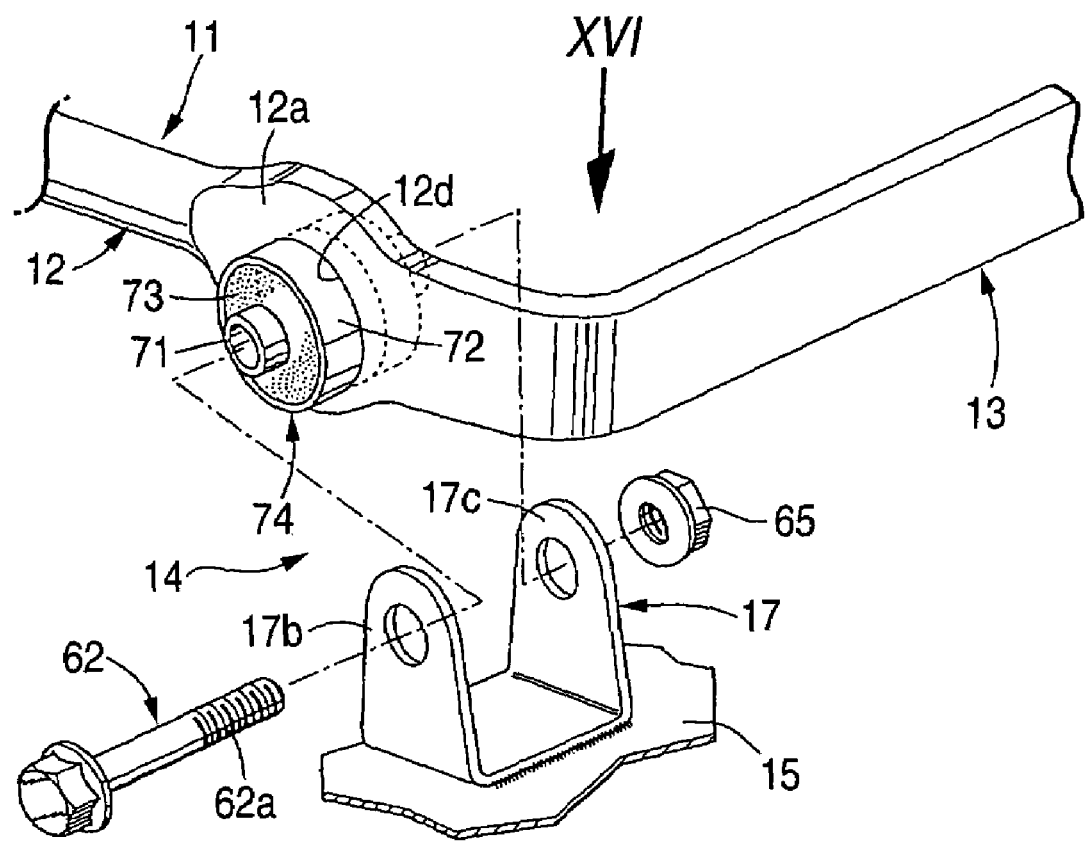
FIG. 15 is a perspective view of a supporting device for a stabilizer according to an eights embodiment of the present invention.
Figure 16:
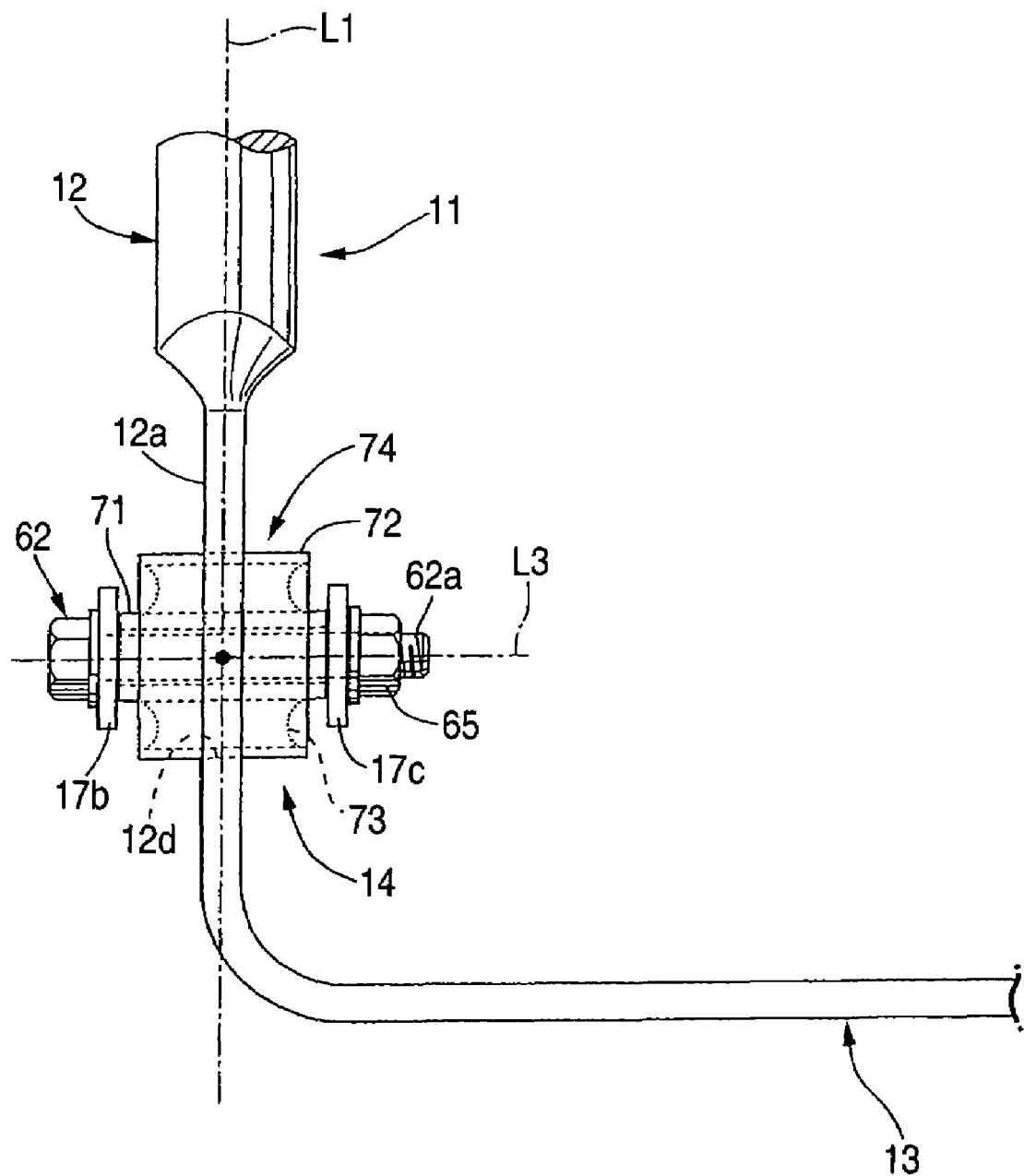
FIG. 16 is a view as seen in a direction indicated by an arrow 16 in FIG. 15.

FIGS. 15 and 16 are drawings showing an eighth embodiment which corresponds to the third aspect of the present invention, FIG. 15 being a perspective view showing a supporting device for a stabilizer and FIG. 16 being a view as seen in a direction indicated by an arrow 16 in FIG. 15.

The eighth embodiment is such as to use a general rubber bushing joint 74 which includes an inner tube 71, an outer tube 73 and an elastic body 73. A torsion bar 12 is provided at each end thereof a flat portion 12a which is formed by press working an end portion thereof so as to become flat, and a flat arm 13 continues to the flat portion 12a. An outer tube 72 of a rubber bushing joint 74 is press fitted in a circular joint supporting hole 12d opened in the flat portion 12a, and a nut 65 is fastened on an externally threaded portion 62 of a supporting shaft 62 which is made up of a bolt which passes through supporting portions 17b, 17c of a bracket 17 fixed to the vehicle body 15 and an inner tube 71 of the rubber bushing joint 74.

According to this eighth embodiment, since an elastic body 73 of the rubber bushing joint 74 is compression deformed when the torsion bar 12 of a stabilizer 11 twists and deforms, the same function and advantage as those attained by the seventh embodiment can also be attained by this eighth embodiment.

Figure 17:
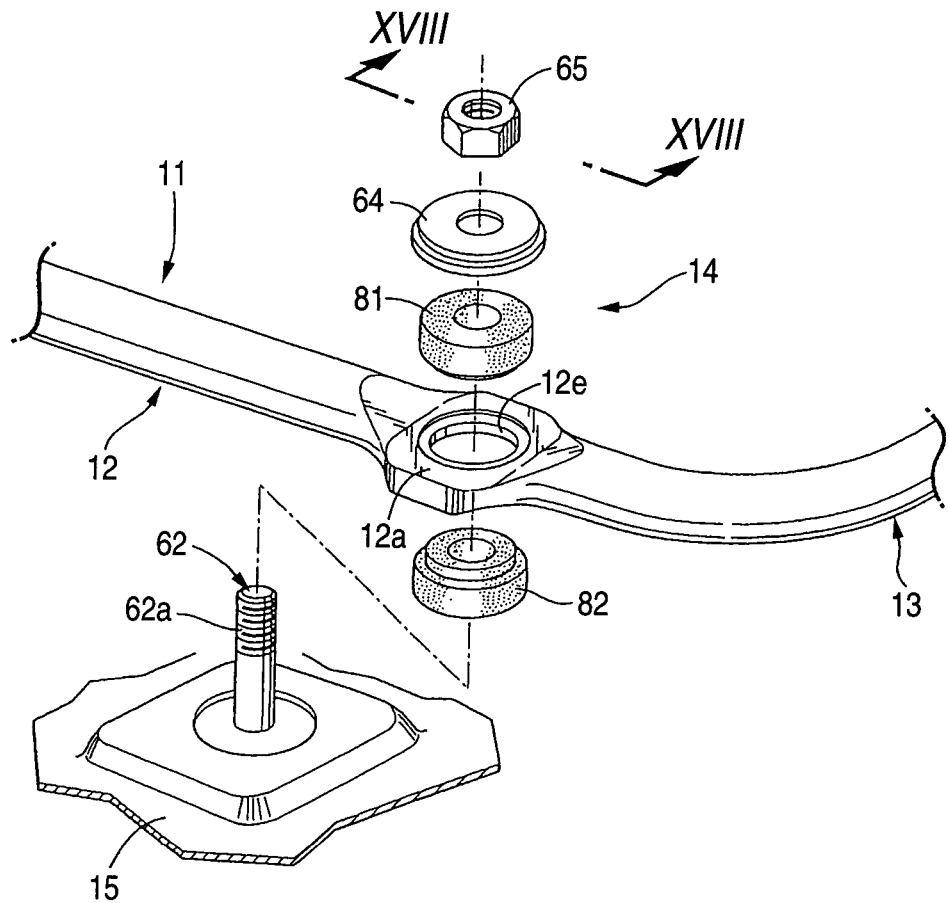
FIG. 17 is a perspective view of a supporting device for a stabilizer according to a ninth embodiment of the present invention.
Figure 18:
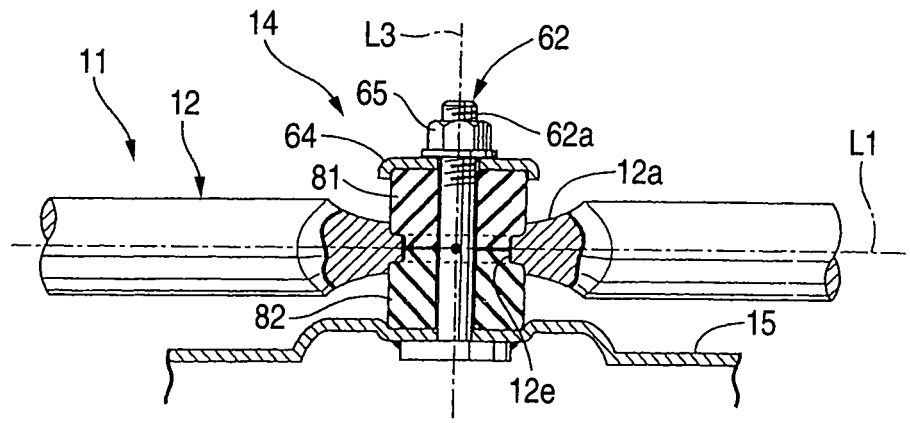
FIG. 18 is a cross-sectional view taken along the line 18-18 in FIG. 17.

FIGS. 17 and 18 are drawings showing a ninth embodiment which corresponds to the third aspect of the present invention, FIG. 17 being a perspective view of a supporting device for a stabilizer and FIG. 18 being a cross-sectional view taken along the line 18-18 in FIG. 17.

The ninth embodiment is a modification to the seventh embodiment, and an axis L3 of a supporting shaft 62 of the ninth embodiment extends in a vertical direction and intersects with an axis L1 of a torsion bar 12 at right angles, while the axis L3 of the supporting shaft 62 of the seventh embodiment extends in the longitudinal direction of the vehicle body and intersects with the axis L1 of the torsion bar 12. An elastic body is vertically divided into two elastic bodies 81, 82, which are then fitted in an elastic body supporting hole 12e in a flat portion 12a of the torsion bar 12, and a nut 65 is fastened via a washer on an externally threaded portion 62a of the supporting shaft 62 which passes through these elastic bodies 81, 82 from a bottom to a top thereof.

The same function and advantage as those attained by the seventh embodiment can also be attained by the ninth embodiment.

Figure 19:
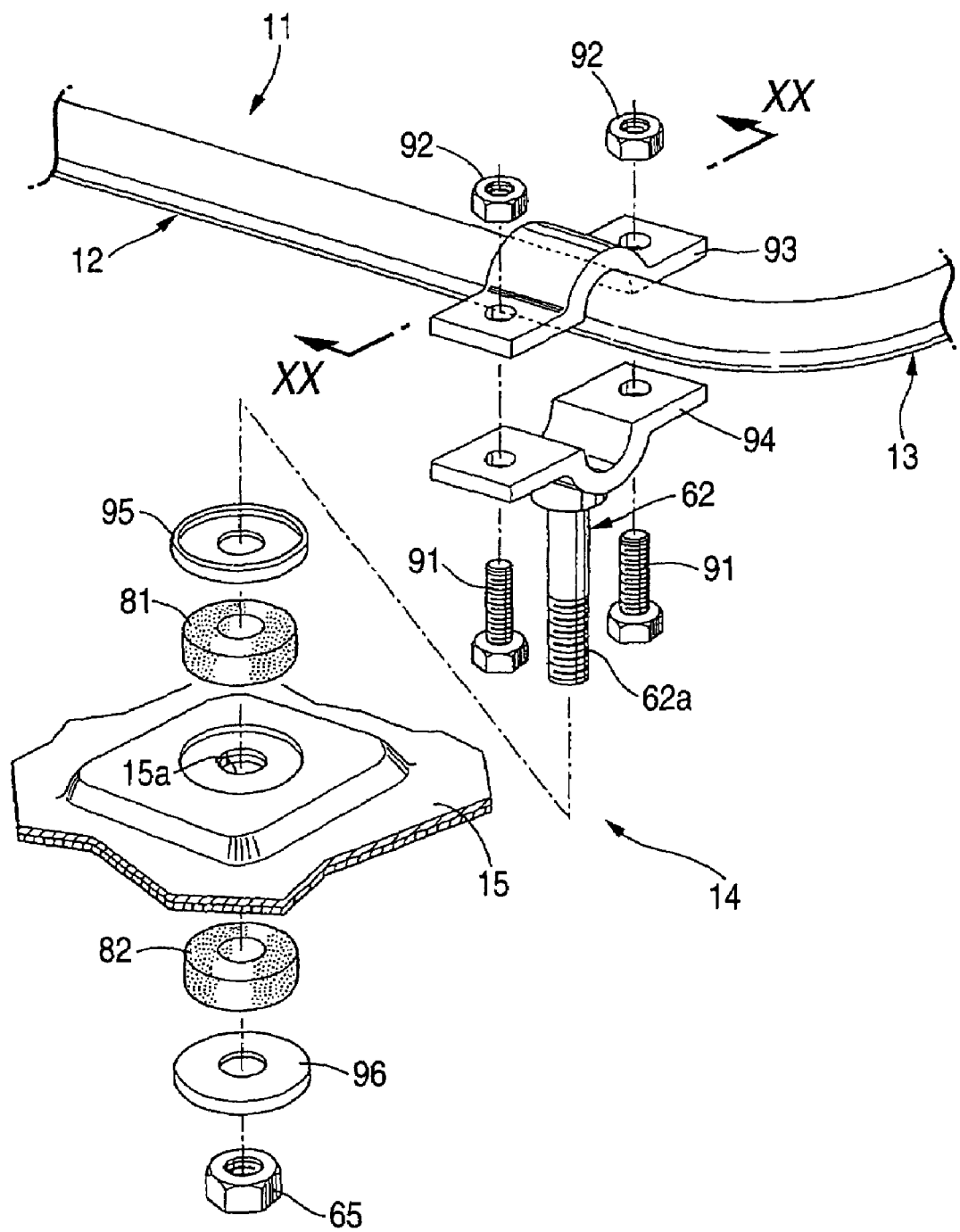
FIG. 19 is a perspective view of a supporting device for a stabilizer according to a tenth embodiment.
Figure 20:
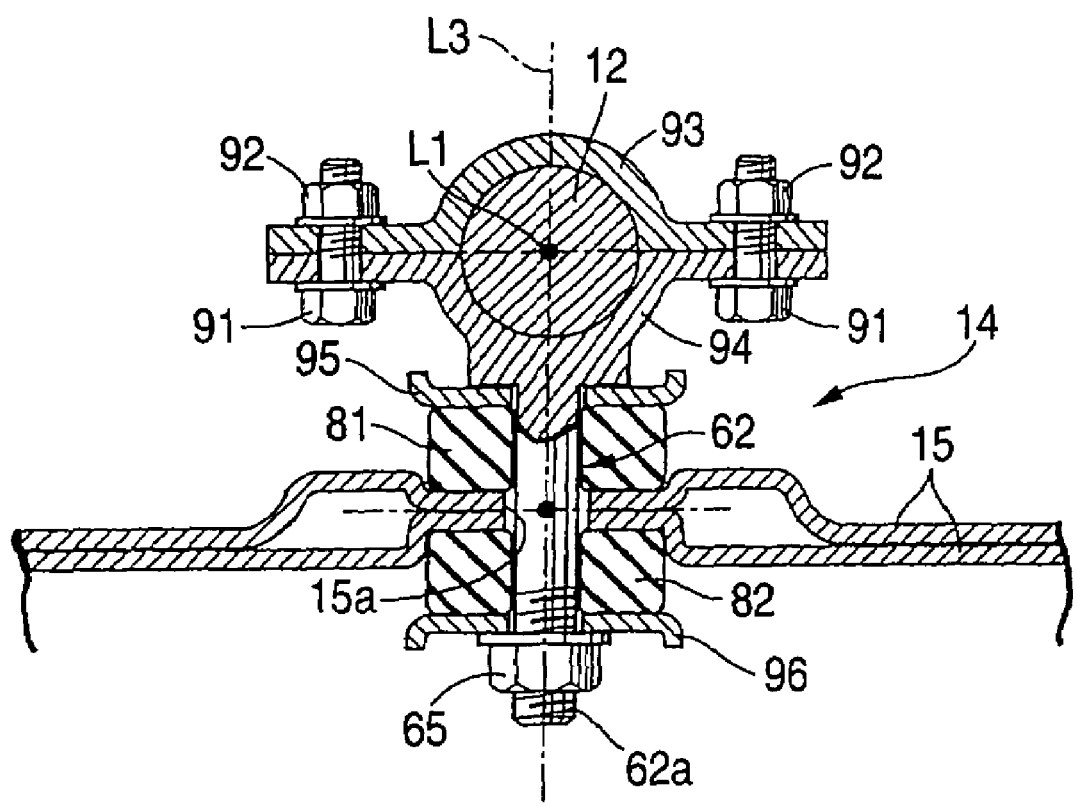
FIG. 20 is a cross-sectional view taken along the line 20-20 in FIG. 19.

FIGS. 19 and 20 are drawings showing a tenth embodiment which corresponds to the third aspect of the present invention, FIG. 19 being a perspective view of a supporting device for a stabilizer, and FIG. 20 being a cross-sectional taken along the line 20-20 in FIG. 19.

The tenth embodiment is a modification to the ninth embodiment, and a supporting shaft 62 of the tenth embodiment is provided on the torsion bar 12 side, while the supporting shaft 62 of the ninth embodiment is provided on the vehicle body 15 side. Namely, of a first bracket 93 and a second bracket 94 which are fixed together with bolts 91, 91 and nuts 92, 92 with a torsion bar 12 being held therebetween, a supporting shaft 62 which extends downwardly so as to intersect with an axis L1 of the torsion bar 12 at right angles is provided integrally on the second bracket 94 which is located on a lower side. Vertically divided two elastic bodies 81, 82 are disposed in such a manner as to hold therebetween a bolt hole 15a formed in the vehicle body 15, and furthermore, washers 95, 96 are placed over a top surface of the elastic body 81 and the bottom surface of the elastic body 82, respectively, a nut 65 being fastened on an externally threaded portion 62a at a distal end of the supporting shaft 62 which passes through the elastic bodies 81, 82, the washers 95, 96 and the bolt hole 15a in the vehicle body 15.

The same function and advantage as those attained by the ninth embodiment can also be attained by the tenth embodiment.

Figure 21:
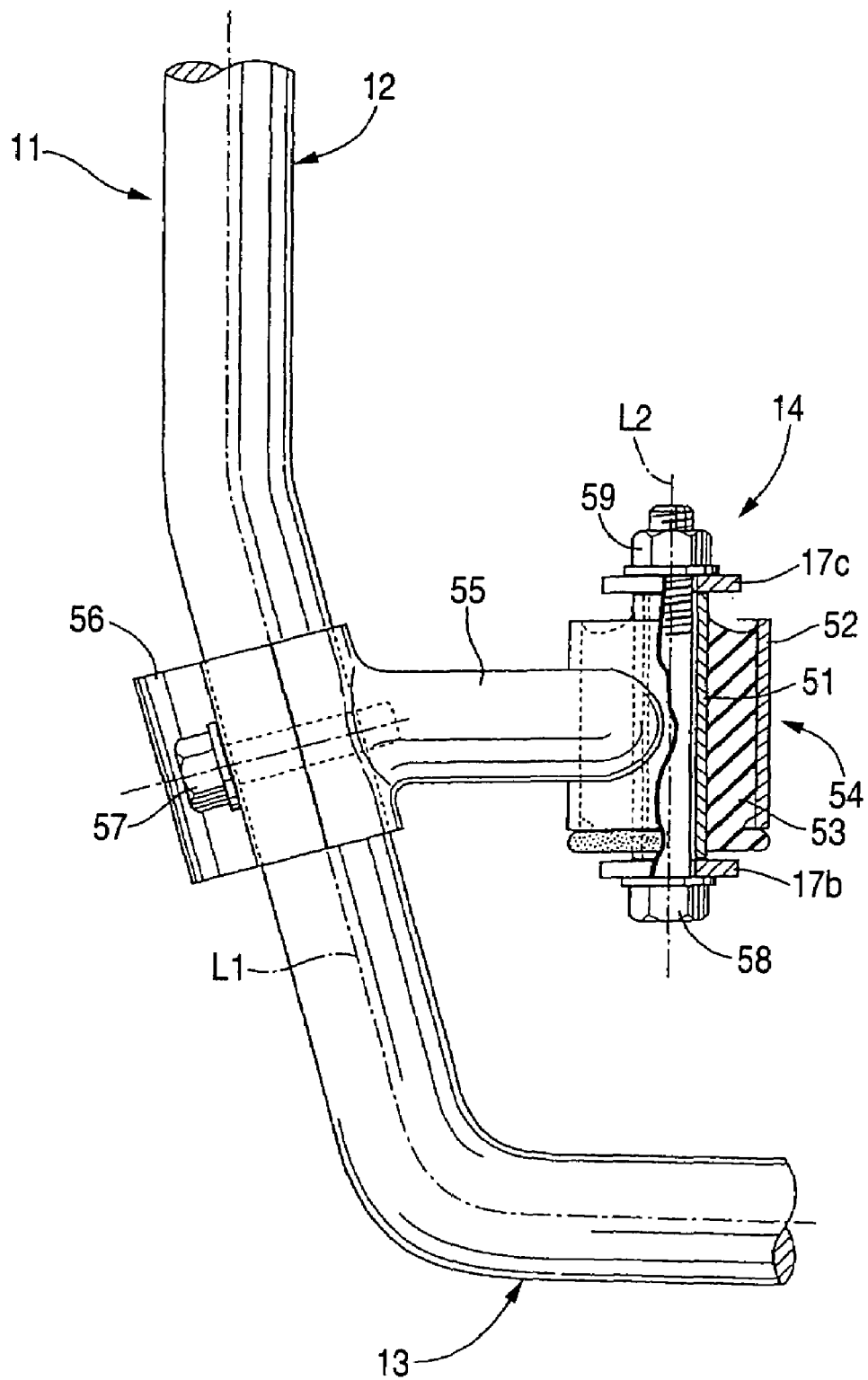
FIG. 21 is a view corresponding to FIG. 8, which shows a modification to the fourth embodiment.

While there has been described in connection with the preferred embodiments of the present invention, it will be obvious to those skilled in the art that various changes and modification may be made therein without departing from the present invention, and it is aimed, For example, while, in the fourth to sixth embodiments which correspond to the second aspect of the present invention, the axis L1 of the torsion bar 12 and the axis L2 of the rubber bushing joint 54 are disposed in parallel with each other, the axes L1 L2 may not be parallel with each other as in the case of a modification to the fourth embodiment shown in FIG. 21. In addition, while, in the fourth to sixth embodiments, the inner tube 51 of the rubber bushing joint 54 is fixed to the vehicle body 15, whereas the outer tube 52 is fixed to the torsion bar 12, the relations of the inner tube and the outer tube with the torsion bar 12 and the vehicle body 15 may be reversed; the outer tube 52 is fixed to the vehicle body 15, whereas the inner tube 51 is fixed to the torsion bar 12.

In addition, the ball joints 18, 18' of the present invention include a pillow ball joint.

Thus, as has been described heretofore, according to the first aspect of the present invention, since the supporting device for supporting the torsion bar of the stabilizer on the vehicle body includes the ball joint, the torsion bar is allowed to freely twist to deform without being subjected to a large frictional force so as to effectively exhibit the function of the stabilizer, thereby making it possible to enhance the riding comfort of the vehicle.

In addition, according to the second aspect of the present invention, since the supporting device for supporting the torsion bar of the stabilizer on the vehicle body includes the joint which includes, in turn, the annular elastic body and the inner tube and the outer tube which are fixed to the joint with one of the inner and outer tubes being fixed to the vehicle body and the other to the torsion bar, the torsion bar is allowed to freely twist to deform without being subjected to a large frictional force due to a circumferential shear deformation of the elastic body so as to effectively exhibit the function of the stabilizer, thereby making it possible to enhance the riding comfort of the vehicle.

Furthermore, according to the third aspect of the present invention, since the supporting device for supporting the torsion bar of the stabilizer on the vehicle body includes the supporting shaft which is fixed to one of the torsion bar and the vehicle body and which has an axis intersecting with an axis of the torsion bar and the elastic body which is fixed to the other of the torsion bar and the vehicle body and through which the supporting shaft passes, the torsion bar is allowed to freely twist to deform without being subjected to a large frictional force due to a compression deformation of the elastic body so as to effectively exhibit the function of the stabilizer, thereby making it possible to enhance the riding comfort of the vehicle.

What is claimed is:

1. A supporting structure of a stabilizer to a vehicle body, the stabilizer comprising:
   a twist-deformable torsion bar extended in a transverse direction of the vehicle body; and a pair of arms extended from respective ends of the torsion bar, the supporting structure comprising:

attaching portions at distal ends of the arms, which are connected to a right and a left suspension; and at least one supporting device connecting the vehicle body to at least one connecting portion of the torsion bar located between the ends of the torsion bar, wherein the at least one supporting device comprises a ball joint which supports the torsion bar rotatably relative to the vehicle body, wherein the at least one connecting portion comprises a flattened portion, and wherein the supporting device further comprises a ball stud, the ball stud comprising a spherical ball and a stalk, and wherein the ball stud is arranged perpendicular to the flattened portion of the connecting portion.

2. The supporting structure of a stabilizer to a vehicle body according to claim 1, wherein the at least one connecting portion comprises an opening, and wherein a portion of the supporting device extends through the opening.

3. The supporting structure of a stabilizer to a vehicle body according to claim 1, wherein the flattened portion of the at least one connecting portion comprises an opening, and wherein the supporting device comprises a ball stud, the ball stud comprising a spherical ball and a stalk, and wherein a portion of the stalk extends through the opening in the flattened portion.

4. The supporting structure of a stabilizer to a vehicle body according to claim 1, wherein the supporting device comprises a boot.

* * * * *